Patented Feb. 8, 1927.

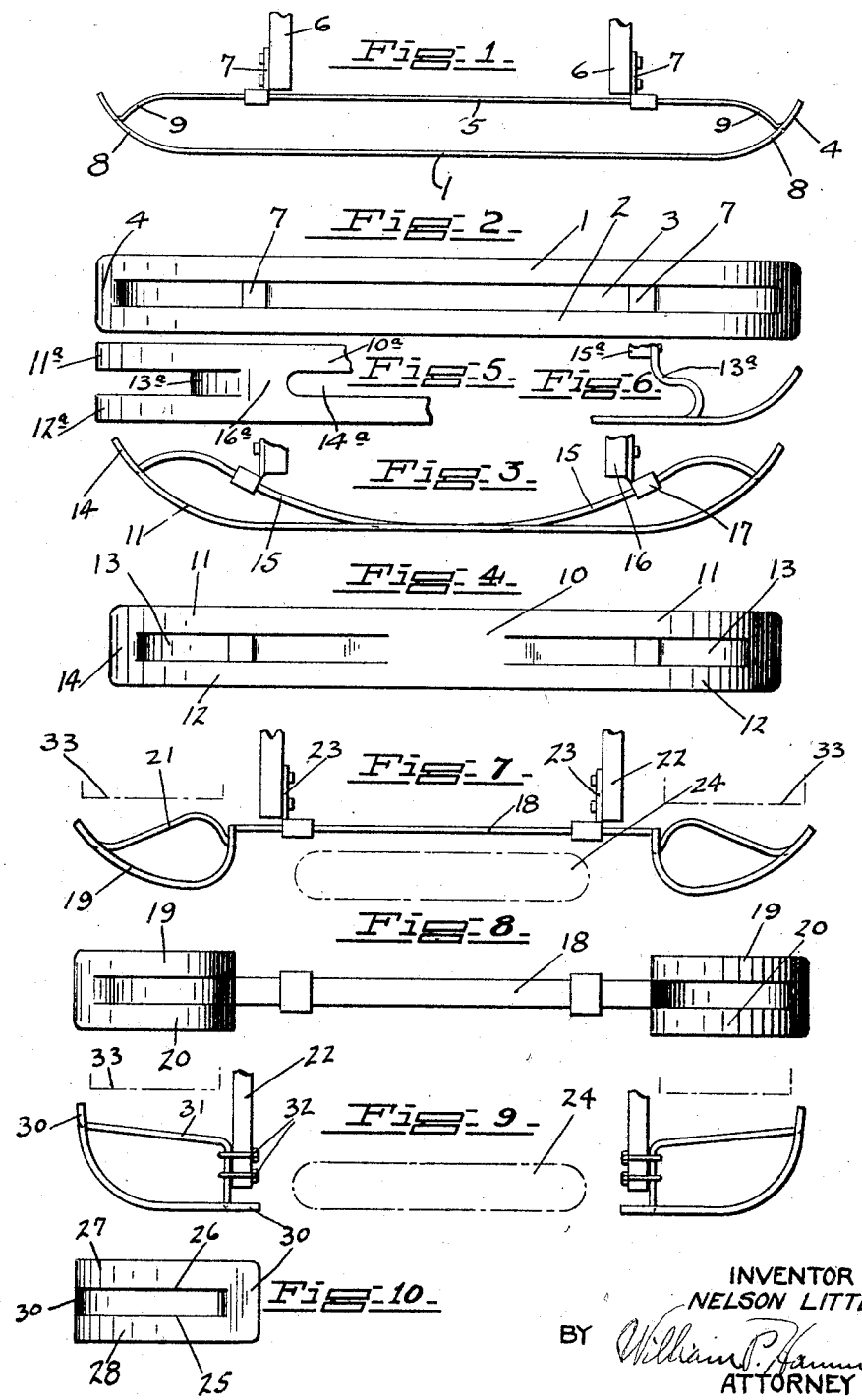

1,616,695

UNITED STATES PATENT OFFICE.

NELSON LITTELL, OF MOUNT VERNON, NEW YORK.

AUTOMOBILE BUMPER.

Application filed January 16, 1926. Serial No. 81,742.

This invention relates to an improvement in bumpers or bumperettes for automobiles, trucks, and other vehicles, and to a method of making the same.

It is an object of the invention to provide a bumper of distinctive appearance, combining grace, beauty, strength, and resiliency, at a lower cost than has been heretofore possible.

Another object of the invention is to provide a multiple bar bumper having two or more separated impact bars and one or more intermediate back bars, all of which parts are integrally connected, having been formed from one piece of metal.

Another object of the invention is to provide an automobile bumper of the multiple impact bar type, with integral connections between the impact bars and back bar, in one piece, with a minimum of manufacturing operations.

Another object of the invention is to provide a method of manufacturing one piece automobile bumpers of the type described in which the bumper is formed from a single wide strip of bumper material by slitting and bending and without any assembling operations.

Various other objects and advantages of the invention will appear as the description thereof proceeds.

Referring now to the drawings, which illustrate certain preferred forms of embodiment of the invention, Fig. 1 is a plan view, and Fig. 2 is a front elevation of one form of automobile front bumper produced in accordance with my invention;

Figs. 3 and 4 are, respectively, a plan view and front view of another form of automobile front bumper embodying the principles of my invention;

Figs. 5 and 6 are front and plan views of approximately the left and right halves of another bumper embodying my invention;

Figs. 7 and 8 are, respectively, a plan view and a rear elevation of an automobile rear bumper embodying my invention;

Fig. 9 is a plan view of an automobile side wing bumper or bumperette applied to the rear of the automobile; and Fig. 10 is a rear elevation of one of the side wing bumpers illustrated in Fig. 9.

In the embodiment of the invention illustrated in Figs. 1 and 2, the automobile bumper comprises a pair of horizontally spaced front bumper strips or bars 1 and 2, having an intermediate space 3 and integral ends 4. It will be understood that the ends 4 may be wider or narrower than the width of the bumper strips 1 and 2, and that the bumper bars 1 and 2 may have other configurations and shapes imparted thereto than the plain bar shown. A back bar member 5, integral with the front bars 1 and 2 and the ends 4, is formed from the metal which is displaced from the opening 3, thereby producing a one-piece bumper comprising horizontally spaced front bar members 1 and 2 and a rearwardly extending back bar member 5, which are integrally connected, and this bumper is adapted to be attached to the side frames or the like 6 of the automobile by means of suitable attaching brackets 7, which adjustably grip the back bar 5.

It will be realized that an automobile bumper of this construction, formed from one piece of metal, has many advantages over the bumpers of the prior art, which comprise a plurality of separate impact bars and back bars connected by means of bolts, clamps, or the like. The bumper presents a neat appearance of massiveness and rigidity, it has no separable parts to be assembled or work loose and rattle in service, and is of greater strength and resiliency than the same bumper made of a plurality of parts, and is easy to handle and to attach to the automobile.

In the manufacture of a bumper of this type, a strip of metal of the desired width of the impact portion is inserted in a suitable press or shear and sheared or slit along the inner edge of the bars 1 and 2 to within a suitable distance of the ends 4. The material for the back bar 5 is then displaced from the mid portion of the slab of metal, to produce the opening 3 with the separated impact bars 1 and 2, and the ends 4 are bent rearwardly to preserve the contour of the bumper. This punching and pressing operation is preferably carried out when the metal is hot, although it is possible to carry out the operation on cold metal. Following the forming operation the bumper may be suitably annealed to relieve the strain of the stamping and forming operation and impart the desired resiliency thereto, after which the front bar members and back bar may be suitably finished by grinding, polishing, electroplating, painting, japanning, or the like. It will be understood that various configurations can be given to the front of the bumper and that it can be made wider or narrower than shown, or that more than two front impact bars may be used, if desired. If desired, the slits along each side of the opening 3 may be formed by sawing, cutting, or the like before the pressing or shaping operation.

The curvature of the front bars and of the back bar may be controlled by the extent of bending at the points 8 and 9 adjacent the connection of the back bar to the impact bar members. In the embodiment shown the curvature of the portions 8 and 9 adjacent this connection is approximately the same; in other words, the back bar extends rearwardly and the front bars extend forwardly approximately equal distances from this point of connection, producing substantially straight impact and back bars with curved ends. A more rounded impact surface may be produced by varying the angle and curvature of the back bar and impact bars adjacent the point of connection.

Figs. 3 and 4 show another embodiment of the invention comprising a front impact portion 10, with an unbroken center having side impact bars 11 and 12 with intervening openings 13 at each side of the unbroken central portion and integral ends 14 of approximately the same width as the unbroken central portion of the impact surface 10. The material displaced from the openings 13 is used to form the back bar members 15 which are connected to the automobile frame 16 by means of clamp members 17 or the like. This bumper may be formed in approximately the same manner as the bumper shown in Figs. 1 and 2, except that two slits or shears are made at each side of the center instead of through the center. If desired the slits may be carried to the ends 14 of the bumper and after shaping the portions 11, 12 and 13 extending from the integral center, may be secured together at the ends by suitable clamps or bolts.

Figs. 5 and 6 show a front view of the left half and a plan view of the right end of a bumper 10ª which is formed from an integral strip of metal, to provide horizontally spaced impact members 11ª and 12ª with integral rearwardly extending back bars or attaching members 13ª, and, if desired, a space 14ª between the impact members at the center thereof. This bumper is formed from a rectangular strip of metal by slitting or cutting the same inwardly from each end along the line of separation of the portions 11ª, 12ª and 13ª to approximately the point indicated, bending the ends of the bars 11ª and 12ª to the desired contour and bending the bar 13ª to a resilient loop shape, as illustrated, to provide an arm for attaching to the automobile frame 15ª. The center 14ª may be removed, if desired. The impact and back bars are integrally connected by the parts 16ª.

Figs. 7 and 8 illustrate another way in which the principles of my invention may be applied in the production of a rear bumper or bumperette combination for automobiles. In this embodiment of the invention, the stock used for producing the bumper comprises a bar 18 having integral ends of increased width which may be slit and bent to produce spaced impact portions 19 and 20 which are connected and strengthened by an integral back bar member 21, the entire bumper being formed by slitting and bending of one integral piece of metal. The bar 18 is connected to the rear of the automobile frame members 22 by means of suitable clamps 23 or the like. In this embodiment of the invention the impact portions 19 and 20 preferably extend rearwardly from the bar 18 to form a pocket in which the spare tire 24, usually carried at the rear of the automobile, may be received and project outwardly to protect the rear fenders. Any desired angle may be imparted to the impact bars 19 and 20 by varying the curvature and slope of these bars and the bar 21 at their points of connection.

Figs. 9 and 10 show how the principles of my invention may be applied to the production of separate bumper wings or bumperettes for the rear of an automobile. In this embodiment of the invention a rectangular piece of metal is slit or sheared along the lines 25 and 26, the central portion bent rearwardly and the outer portions forwardly to produce spaced impact members 27 and 28, which are integrally connected by the end members 30 and integrally connected to the back bar member 31, these bumper wings being connected to the rear side frames 22 of the automobile by means of any suitable clips or clamps 32, in position to protect the fenders 33 at the rear of the automobile and the spare tire 24 and tire carrier without interfering with the removal of the spare tire from its support.

It will be understood that my invention contemplates broadly the production of a one-piece automobile spring bumper having spaced impact portions and integral back bars or attaching portions and that the principles of the invention may be applied to produce bumpers of various design, within the spirit of the invention and the scope of the appended claims.

I claim:

1. A one-piece flexible automobile bumper having a pair of vertically spaced impact portions integrally connected at the ends thereof and an integral back bar formed from the metal of the space between said impact portions, the back bar and the impact portions being curved rearwardly and forwardly respectively, approximately equal distances from the point of connection between said members and being of substantially equal length to form substantially straight impact and back bar portions between said curved portions, and the ends of said impact portions being curved rearwardly of the point of connection of said impact portions and back bar.

2. A one-piece flexible automobile bumper comprising vertically spaced impact portions, integral connecting portions extending vertically between said impact portions and having rearwardly extending back bar portions integral with and extending from one of the connecting portions to the other, the length of the back bar portions and the impact portions between said connecting portions being substantially equal and spaced forwardly and rearwardly approximately equal distances from a line joining the points of connection to form a flexible bumper.

3. The method of making a flexible automobile bumper having integral impact and back bar portions which comprises slitting a strip of bumper material between the ends thereof, bending the material between said slits rearwardly and bending the material outside said slits forwardly approximately equal distances from a line joining the points of connection of said slit portions with the said strip without substantially stretching said material.

4. The method of making an automobile bumper having vertically spaced impact bars, which comprises forming parallel slits between the ends of a strip of bumper material, bending the portion between said slits rearwardly, and bending the portion outside said slits forwardly approximately equal distances from a line joining the points of connection to form impact members and back bars with a spring loop connection between the same.

5. A one-piece automobile bumper comprising a pair of spaced front bars, a back bar extending substantially from end to end of said front bars and spaced rearwardly therefrom, both of said front bars and said back bar being integrally connected at the ends thereof.

6. A one-piece flexible bumper for automobiles comprising a pair of spaced front impact bars, and a back bar extending substantially from end to end of said front bars and spaced rearwardly therefrom, both of said front bars and the back bar being formed from one piece of sheet metal and being integrally connected at the ends thereof, each of said front bars and the back bar between the points of connection being of substantially equal length.

In testimony whereof I have affixed my signature to this specification.

NELSON LITTELL.